United States Patent
Genda

(10) Patent No.: US 8,089,651 B2
(45) Date of Patent: Jan. 3, 2012

(54) RIGHT INFORMATION MANAGING DEVICE, INFORMATION PROCESSING SYSTEM, AND COMPUTER READABLE MEDIUM

(75) Inventor: Kohei Genda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 630 days.

(21) Appl. No.: 12/193,400

(22) Filed: Aug. 18, 2008

(65) Prior Publication Data

US 2009/0174891 A1   Jul. 9, 2009

(30) Foreign Application Priority Data

Jan. 9, 2008  (JP) ................................. 2008-002043

(51) Int. Cl.
  *G06F 3/12* (2006.01)
(52) U.S. Cl. ..................... 358/1.15; 358/1.13; 358/1.14; 358/1.16
(58) Field of Classification Search .......... 358/1.12–1.18
  See application file for complete search history.

(56) References Cited

U.S. PATENT DOCUMENTS

| | | | | |
|---|---|---|---|---|
| 6,202,092 | B1 * | 3/2001 | Takimoto | ..................... 709/225 |
| 2003/0191846 | A1 | 10/2003 | Hunnicutt et al. | |
| 2005/0078332 | A1 * | 4/2005 | Brown | ......................... 358/1.14 |
| 2006/0132823 | A1 * | 6/2006 | Sakamoto | .................... 358/1.14 |
| 2007/0273915 | A1 * | 11/2007 | Nakagawa | .................... 358/1.14 |
| 2008/0130026 | A1 * | 6/2008 | Mizuno | .......................... 358/1.9 |

FOREIGN PATENT DOCUMENTS

| | | |
|---|---|---|
| JP | A-2000-0099470 | 4/2000 |
| JP | A-2000-112891 | 4/2000 |
| JP | A-2004-246716 | 9/2004 |
| JP | A-2004-272614 | 9/2004 |
| WO | WO 01/52471 A1 | 7/2001 |

OTHER PUBLICATIONS

Notice of Preliminary Rejection for corresponding Korean Patent Application No. 10-2008-0091005, mailed on Jan. 14, 2011 (w/ English translation).

* cited by examiner

*Primary Examiner* — Chan Park
(74) *Attorney, Agent, or Firm* — Oliff & Berridge, PLC

(57) ABSTRACT

A right information managing device includes: a right information storage that associates both old right information and new right information with a target user, and that stores, as first right information showing the right to use of the target user for an information processor, the information associated with the target user; a detecting unit that detects a start of a use of the information processor based on the new right information by the target user; and a use limiting unit that limits the use of the information processor based on the old right information by the target user in accordance with a result obtained by the detecting unit.

11 Claims, 5 Drawing Sheets

FIG. 2

| ORGANIZATION SPECIFYING INFORMATION | DEPARTMENT P1 | DEPARTMENT P2 | ... |
|---|---|---|---|
| RIGHT INFORMATION | RIGHT INFORMATION A1 | RIGHT INFORMATION A2 | ... |
| USER SPECIFYING INFORMATION | USER U1 | USER U3 | ... |
| | USER U2 | USER U5 | |
| | USER U4 | USER U6 | |
| | USER U7 | | |

| USER SPECIFYING INFORMATION | ASSIGNED ORGANIZATION SPECIFYING INFORMATION |
|---|---|
| USER U1 | DEPARTMENT P1 |
| USER U2 | DEPARTMENT P1 |
| USER U3 | DEPARTMENT P2 |
| USER U4 | DEPARTMENT P1 |
| USER U5 | DEPARTMENT P2 |
| USER U6 | DEPARTMENT P2 |
| USER U7 | DEPARTMENT P1 |
| ⋮ | ⋮ |

D2

| ORGANIZATION SPECIFYING INFORMATION | DEPARTMENT P1 | DEPARTMENT P2 | . . . |
|---|---|---|---|
| RIGHT INFORMATION | RIGHT INFORMATION A1 | RIGHT INFORMATION A2 | . . . |
| USER SPECIFYING INFORMATION | USER U1 | USER U3 | . . . |
| | USER U2 | USER U5 | |
| | USER U4 | USER U6 | |
| | USER U7 | USER U1 | |

T1

| OBJECT USER | OLD ORGANIZATION | NEW ORGANIZATION |
|---|---|---|
| USER U1 | DEPARTMENT P1 | DEPARTMENT P2 |
| ⋮ | ⋮ | ⋮ |

| ORGANIZATION SPECIFYING INFORMATION | DEPARTMENT P1 | DEPARTMENT P2 | · · · |
|---|---|---|---|
| RIGHT INFORMATION | RIGHT INFORMATION A1 | RIGHT INFORMATION A2 | · · · |
| USER SPECIFYING INFORMATION | USER U2 | USER U3 | · · · |
| | USER U4 | USER U5 | |
| | USER U7 | USER U6 | |
| | | USER U1 | |

T1

FIG. 8

| USER SPECIFYING INFORMATION | RIGHT INFORMATION | NEW RIGHT INFORMATION |
|---|---|---|
| USER U1 | RIGHT INFORMATION A1 | RIGHT INFORMATION A2 |
| USER U1 | RIGHT INFORMATION A3 | |
| USER U2 | RIGHT INFORMATION A4 | |
| ⋮ | ⋮ | ⋮ |

T1

US 8,089,651 B2

RIGHT INFORMATION MANAGING DEVICE, INFORMATION PROCESSING SYSTEM, AND COMPUTER READABLE MEDIUM

CROSS-REFERENCE TO RELATED APPLICATIONS

This application is based on and claims priority under 35 U.S.C. 119 from Japanese Patent Application No. 2008-002043 filed Jan. 9, 2008.

BACKGROUND

1. Technical Field

The present invention relates to a right information managing device, an information processing system, and a computer readable medium.

2. Related Art

In recent years, in an office or the like, various kinds of information processors, are employed, such as a file server for managing files in which various kinds of data is stored, or an image processor (a printer, a scanner, a compound machine, etc.) for printing or reading image information. When users use these information processors, a control may be occasionally made, from the viewpoint of security, so that each user is controlled to use the information processors in accordance with rights to use them previously set to the users. Specifically, for instance, such a control is made that only the users belonging to a certain department are allowed to use an image processor installed in this department.

SUMMARY

According to an aspect of the present invention, a right information managing device includes: a right information storage that associates both old right information and new right information with a target user, and that stores, as first right information showing the right to use of the target user for an information processor, the information associated with the target user; a detecting unit that detects a start of a use of the information processor based on the new right information by the target user; and a use limiting unit that limits the use of the information processor based on the old right information by the target user in accordance with a result obtained by the detecting unit.

BRIEF DESCRIPTION OF THE DRAWINGS

Exemplary embodiment of the present invention will be described in detail based on the following figures, wherein:

FIG. 2 is a diagram showing one example of information included in a right information table;

FIG. 3 is a diagram showing one example of information included in a user database;

FIG. 7 is a diagram showing one example of contents of the right information table updated by a use limiting part; and FIG. 8 is a diagram showing another example of information included in the right information table.

DETAILED DESCRIPTION

Figure 1:
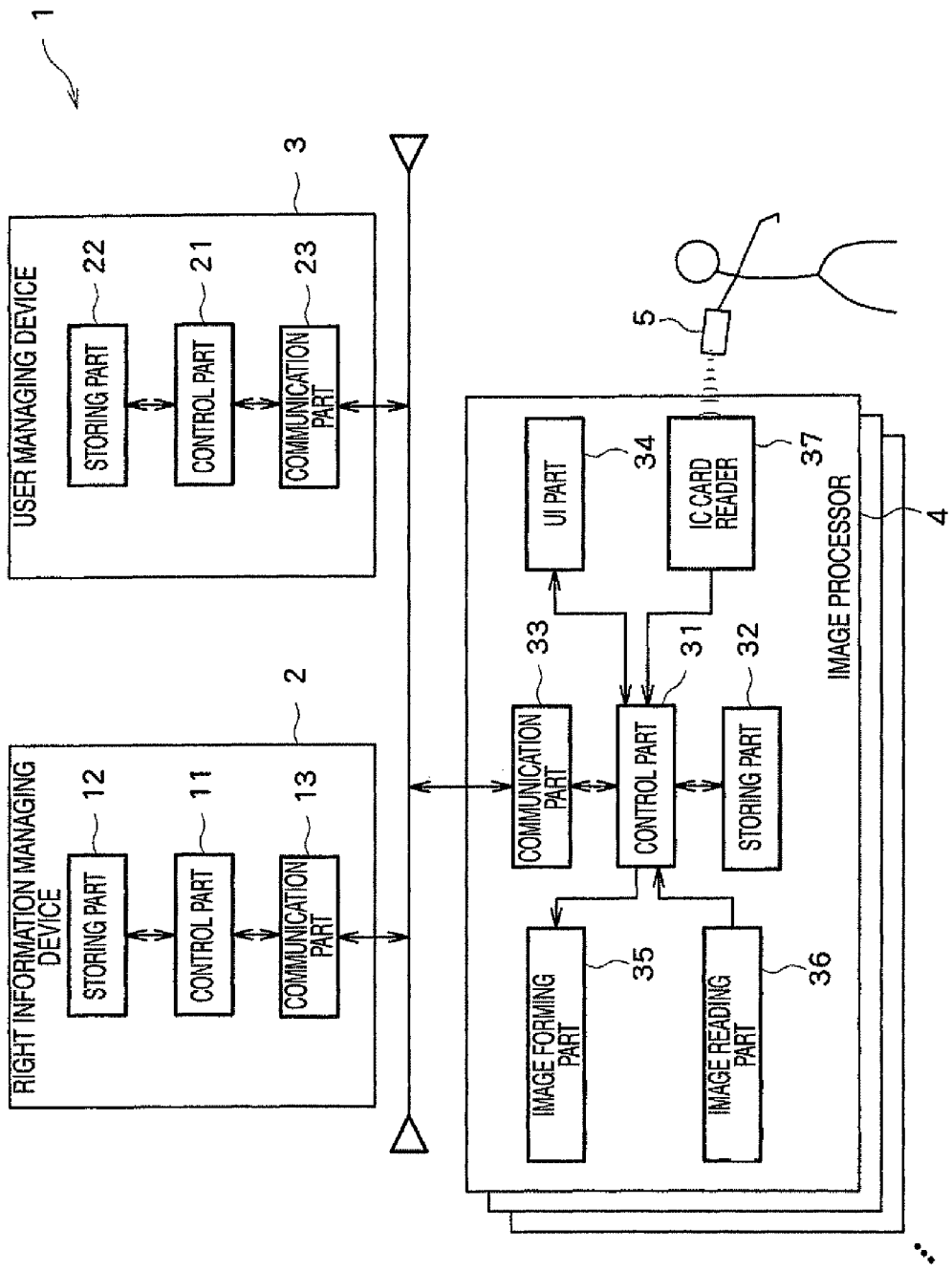
FIG. 1 is a diagram showing a schematic structural example of an information processing system according to an embodiment of the present invention.

Now, an embodiment of the present invention will be described below by referring to the drawings.

FIG. 1 is a diagram showing a schematic structure of an information processing system 1 including a right information managing device according to one embodiment of the present invention. As shown in FIG. 1, the information processing system 1 includes the right information managing device 2, a user managing device 3 and plural image processors 4. These devices are mutually connected so as to make a communication through a communication unit such as a LAN.

The right information managing device 2 is, for instance, a server computer and includes, as shown in FIG. 1, a control part 11, a storing part 12 and a communication part 13. The right information managing device 2 manages right information set to users of the information processors in the information processing system 1.

The control part 11 is, for instance, a CPU and executes various kinds of information processes in accordance with a program stored in the storing part 12. In this embodiment, a specific example of a process executed by the control part 11 will be described below.

The storing part 12 is a memory element such as a RAM or a ROM and includes a hard disk or the like. The storing part 12 holds the program executed by the control part 11 or various kinds of data. Further, the storing part 12 also operates as a work memory of the control part 11.

The communication part 13 is a network interface such as a LAN card and transmits and receives information between the user managing device 3 or the image processors 4 and the communication part 13 through the communication unit.

The user managing device 3 is, for instance a server computer, and includes, as shown in FIG. 1, a control part 21, a storing part 22 and a communication part 23. The control part 21, the storing part 22 and the communication part 23 may respectively have the same structures as those of the control part 11, the storing part 12 and the communication part 13. The user managing device 3 is, for instance, a personnel server for managing employees belonging to an enterprise and manages information related to the users using the information processing system 1 according to this embodiment.

The image processor 4 is, for instance, a compound machine (a device having plural functions of a printer, a copying machine, a scanner, a facsimile device, etc.) and includes, as shown in FIG. 1, a control part 31, a storing part 32, a communication part 33, a UI (User Interface) part 34, an image forming part 35, an image reading part 36 and an IC card reader 37. The control part 31, the storing part 32 and the communication part 33 may respectively have the same structures as those of the control part 11, the storing part 12 and the communication part 13. The communication part 33 may include a communication interface such as a modem for transmitting and receiving data through a public line network. Thus, a facsimile function for transmitting and receiving image data through the public line network is realized.

The UI part 34 is formed with a touch panel or a liquid crystal display and an inputting device (for instance, a keyboard, a touch pad, etc.) The UI part 34 displays information of a menu screen for urging the user to input an instruction in accordance with an instruction from the control part 31. Further, the UI part 34 receives the input of the instruction from the user and outputs information showing the contents thereof to the control part 31.

The image forming part 35 is formed with a printer engine of a laser printer or an ink jet printer to carry out a printing process for forming an image on a medium such as a sheet in accordance with the instruction from the control part 31. Further, the image reading part 36 is an image scanner that carries out a scanning process for reading the image formed on the medium such as the sheet and outputting data showing the image.

The IC card reader 37 reads information recorded on an IC card and outputs the information to the control part 31. In this embodiment, the IC card reader 37 reads information (a user ID or the like) for specifying the user and certifying information for certifying the user from the IC card 5 carried by the user.

Now, in this embodiment, the information stored in the right information managing device 2 and the user managing device 3 will be described below. In this embodiment, the right information managing device 2 stores a right information database D1 in the storing part 12. The right information database D1 includes information that associates the user with the right information showing the right to use of the user.

The right information is information showing the right to use (that is, a permission/inhibition of various kinds of uses) of the user for one or plural information processors included in the information processing system. In this embodiment, it is assumed that the right information indicates the right to use of the user relative to the plural image processors 4 included in the information processing system 1. As a specific example, the right information may include information for specifying the image processor 4 of the plural image processors 4 that permits the user to use. Further, the right information may include information showing a kind of processes (for instance, a color printing process or a transmitting process of a facsimile device) whose execution is permitted relative to each of the image processors 4 in accordance with a request of the user.

Now, in this embodiment, a specific example of data included in the right information database D1 will be described below. In this example, the user of the information processing system 1 belongs to at least one of plural organizations. It is assumed that the right information database D1 includes a right information table T1 associating each organization with the user belonging to the organization and the right information showing the right to use of the user belonging to the organization.

FIG. 2 is a diagram showing a specific example of contents of such a right information table T1. In the example shown in FIG. 2, user specifying information for specifying each of one or plural users belonging to the organization and the right information are associated with organization specifying information for specifying each organization (department). In the example shown in FIG. 2, all of the users U1, U2, U4 and U7 belonging to a department P1 commonly have the right to use shown by the right information A1.

The user may belong to the plural organizations. Specifically, for instance, the user may belong to an organization of a project that extends over plural departments as well as a department to which the user belongs. Further, when there is a superior organization including plural departments and the right information is associated with each department and the superior organization, the user belonging to any of the plural departments may be associated with both the department to which the user directly belongs and the superior organization to which the department belongs. In this case, one user is associated with the plural right information items in the right information table T1.

Further, in this embodiment, the user managing device 3 stores a user database D2 in the storing part 22. The user database D2 includes information for associating each user with user-related information. The user-related information includes, for instance, information specifying an organization to which the user belongs out of the plural organizations or information showing a post of the user.

FIG. 3 is a diagram showing a specific example of contents of the user database D2. In the example shown in FIG. 3, organization specifying information (assigned organization specifying information) for specifying an organization to which the user specified by user specifying information belongs is associated with the user specifying information for specifying each user. In the user database D2, one user may be associated with plural organizations.

Figure 4:
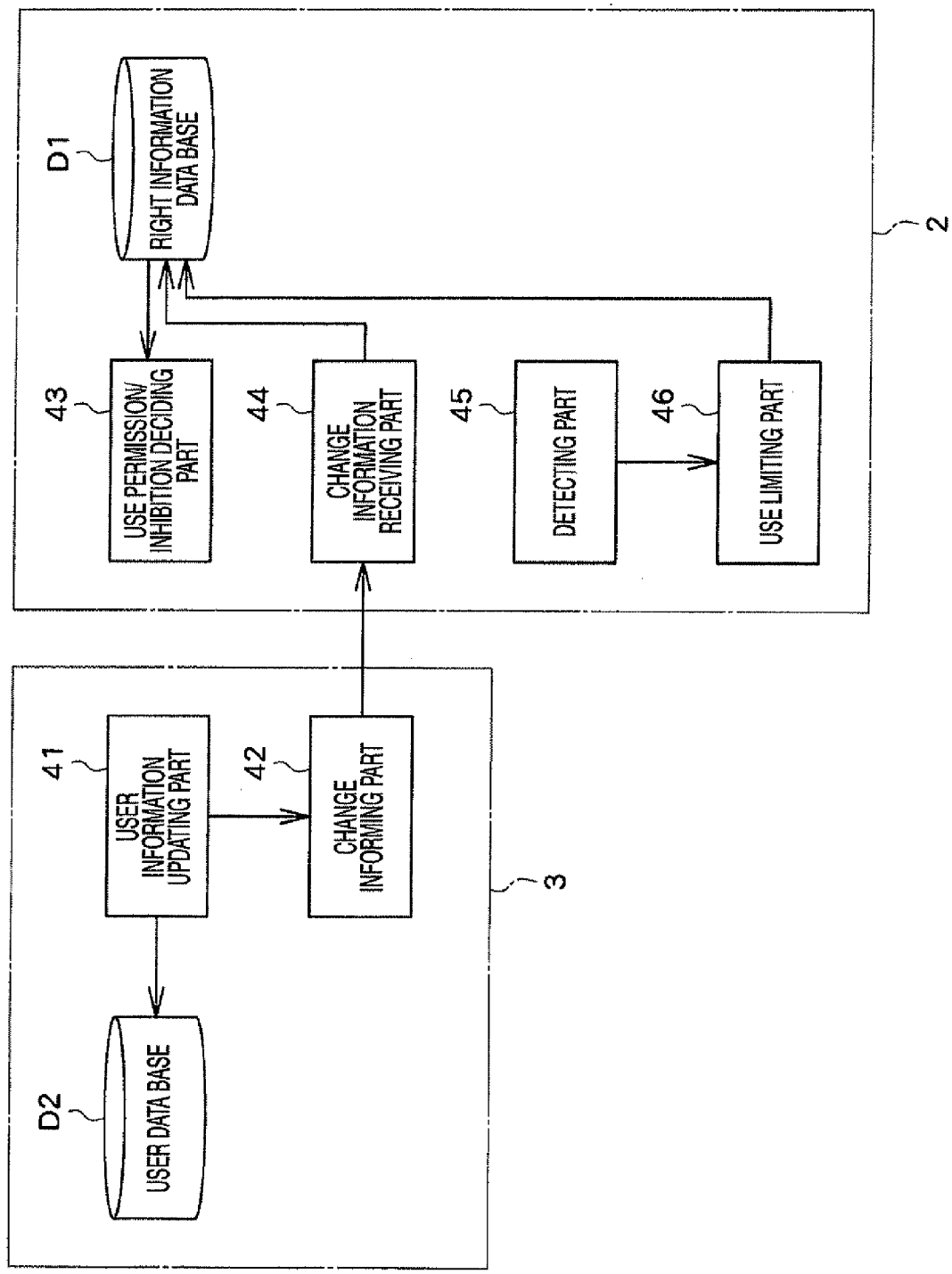
FIG. 4 is a functional block diagram showing one example of functions realized by the information processing system according to the embodiment of the present invention.

Now, functions realized by the information processing system 1 according to this embodiment will be described below. The information processing system 1 functionally includes, as shown in FIG. 4, a user information updating part 41, a change informing part 42, a use permission/inhibition deciding part 43, a change information receiving part 44, a detecting part 45 and a use limiting part 46. The user information updating part 41 and the change informing part 42 of these functions are realized by, for instance, executing a program stored in the storing part 22 by the control part 21 of the user managing device 3. Further, the use permission/inhibition deciding part 43, the change information receiving part 44, the detecting part 45 and the use limiting part 46 are realized by, for instance, executing a program stored in the storing part 12 by the control part 11 of the right information managing device 2. These programs may be provided through a communication unit, for instance, an internet or may be stored and provided in an information recording medium such as a CD-ROM or a DVD-ROM that can be read by various kinds of computers.

The user information updating part 41 updates the contents of the user database D2 stored in the storing part 22 of the user managing device 3 in accordance with an input of data by a person in charge of human affairs. Specifically, when the department (the organization) in an enterprise to which a certain user belongs changes due to, for instance, personnel changes, the user information updating part 41 changes the organization associated with the user in the user database D2 to a new organization (refer an organization to as a new organization, hereinafter) after the personnel changes from an organization (refer it to as an old organization, hereinafter) to which the user ever belongs. The user whose organization is changed by the user information updating part 41 is referred to as a target user Ut, hereinafter. As a specific example, when the organization to which the target user Ut belongs is changed from a department P1 to a department P2, the user information updating part 41 changes the assigned organization specifying information that has been associated with the target user Ut and stored in the user database D2 to the organization specifying information showing the department P2 from the organization specifying information showing the department P1.

When the user-related information related to the target user Ut in the user database D2 is changed by the user information updating part 41, the change informing part 42 informs the right information managing device 2 of information showing the change. Here, as a specific example, when the organization to which the target user Ut belongs is changed from the old organization to the new organization, the change informing part 42 informs the right information managing device 2 of information showing the change (refer it to as assigned organization change information, hereinafter). Specifically, the assigned organization change information reported by the change informing part 42 includes at least information for specifying the target user Ut and information for specifying the new organization. The assigned organization change information may include information for specifying the old organization. Further, the assigned organization change information may include other information such as information showing, for instance, a date when the organization to which the target user Ut belongs is changed from the old organization to the new organization.

The use permission/inhibition deciding part 43 receives a request for use by the user from each information processor (here, each image processor 4) in the information processing system 1. Here, the request for use is a request for carrying out various kinds of processes by using the image processor 4 by each user. Specifically, in this embodiment, each user allows the IC card reader 37 of the image processor 4 that the user desires to use to read information recorded on the IC card 5 possessed by the user himself or herself. Thus, the image processor 4 communicates with, for instance, a certifying server (not shown in the drawing) that holds certifying information of each user to certify the user. Then, the image processor 4 transmits the request for use including the contents of a process requested by the user, information for specifying the user and information for specifying the image processor 4 (for instance, a device ID or the like) to the right information managing device 2 in accordance with an instructing operation of the user to the UI part 34. Here, the certifying server may be formed integrally with the user managing device 3. The image processor 4 may not certify the user and may transmit the information recorded on the IC card 5 to the right information managing device 2, and the right information managing device 2 may communicate with the certifying server to certify the user. Further, when it can be recognized that the information of the user exists in the right information database D1 without using the certifying server, the user may be considered to be certified.

The use permission/inhibition deciding part 43 that receives the request for use from the image processor 4 decides whether the requested use is permitted or inhibited on the basis of the right information stored in the right information database D1. Specifically, the use permission/inhibition deciding part 43 refers to the right information associated with the user who requests to use the image processor in the right information database D1 to decide whether the requested use is permitted or inhibited. Then, the use permission/inhibition deciding part 43 returns a decided result to the image processor 4 that transmits the request for use. Thus, each user uses the image processor 4 within a range of the right to use designated by the right information associated with the user himself or herself.

The change information receiving part 44 receives the assigned organization change information reported by the change informing part 42. Specifically, the change information receiving part 44 receives the assigned organization change information transmitted from the user managing device 3. Then, the change information receiving part 44 updates the right information database D1 in accordance with the received assigned organization change information. Specifically, the change information receiving part 44 updates the right information database D1 so that the target user Ut to be changed in the received assigned organization change information is associated with the new organization.

As described above, the right information table T1 in the right information database D1 includes information that associates each of the organizations with users belonging thereto. Accordingly, when the change information receiving part 44 receives the assigned organization change information, the target user Ut is associated with the old organization in the right information database D1. However, the change information receiving part 44 does not delete the information of the target user Ut related to the old organization from the right information table T1 and newly adds information showing the target user Ut as the user belonging to the new organization thereto. Thus, in the right information database D1, both the old organization and the new organization are associated with the target user Ut.

Figure 5:
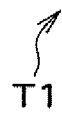
FIG. 5 is a diagram showing one example of contents of the right information table updated by a change information receiving part.

As a specific example, an explanation will be given to an updating process carried out by the change information receiving part 44 when the user U1 is the target user Ut and the organization to which the user U1 belongs is changed from the department P1 to the department P2. In this case, the change information receiving part 44 adds information that associates the user U1 with the department P2 to the right information table T1. If the contents of the right information table T1 are those as shown in FIG. 2 when the change information receiving part 44 receives the assigned organization change information, the right information table T1 is updated changed to contents as shown in FIG. 5 by the change information receiving part 44.

Further, as described above, in the right information table T1, for both old organization and new organization, the right information showing the rights to use of the users who belong to the organization is associated with the organization. Accordingly, in the right information database D1, the right information associated with the new organization (refer it to as new right information An, hereinafter) is associated with the target user Ut in addition to the right information associated with the old organization (refer it to as old right information Ao) in accordance with the updating process of the change information receiving part 44. For instance, in an example shown in FIG. 5, the user U1 as the target user Ut is associated with the right information A2 as the new right information An as well as the right information A1 as the old right information Ao. Under this state, when the target user Ut requests to use any of the image processors 4, the use permission/inhibition deciding part 43 decides whether the requested use is permitted or inhibited on the basis of both the old right information Ao and the new right information An. That is, when the right to use of the target user Ut is included in either of the ranges of the right to use of the old organization and the right to use of the new organization, the request for use by the target user Ut is permitted. For instance, when a transmitting process of a facsimile device cannot be carried out in the right to use of the old organization, however, the transmitting process of the facsimile device can be carried out in the right to use of the new organization, the transmitting process of the facsimile device is permitted.

Further, the change information receiving part 44 adds to the right information database D1 information showing a coordinating relation between the old right information Ao and the new right information An for the target user Ut. As a specific example, the right information database D1 in this embodiment includes an assigned organization change managing table T2. In this case, when the change information receiving part 44 receives the assigned organization change information, the change information receiving part adds the information showing the coordinating relation between the old right information Ao and the new right information An to the assigned organization change managing table T2 in accordance with the received assigned organization change information.

Figure 6:
FIG. 6 is a diagram showing one example of information included in an assigned organization change managing table.

FIG. 6 is a diagram showing one example of data included in the assigned organization change managing table T2. The example shown in FIG. 6 indicates that the right to use of the user U1 for each information processor needs to be changed from the right to use designated by the old right information Ao associated with the department P1 to the right to use designated by the new right information An associated with the department P2 in accordance with the change of an assigned organization arising in the user U1 in the user database D2. However, in this stage, the right to use designated by the new right information An is merely added to the target user Ut and the right to use is not completely changed.

The detecting part 45 detects the start of a use of each information processor based on the new right information An by the target user Ut. For instance, when the detecting part 45 receives information reported by each information processor in the information processing system 1, the detecting part 45 decides whether or not the received information satisfies a prescribed condition. Then, when the detecting part decides that the received information satisfies the prescribed condition, the detecting part 45 detects that the use of the image processor 4 based on the new right information An is started. A specific example of a method will be described below that the detecting part 45 detects the start of the use of the image processor based on the new right information An by the target user Ut.

The use limiting part 46 limits the use of each information processor based on the old right information Ao by the target user Ut in accordance with a detected result by the detecting part 45. That is, when the start of the use of each image processor 4 based on the new right information An by the target user Ut is detected, the use limiting part 46 limits the use of each image processor 4 based on the old right information Ao by the target user Ut.

As a specific example, the use limiting part 46 deletes the information of the target user Ut from the users associated with the old organization in the right information table T1 to limit the use of each image processor 4 based on the old right information Ao of the target user Ut. Otherwise, flag information showing that the information of the target user Ut associated with the old organization is nullified may be associated with the information of the target user Ut so that the use of each image processor 4 based on the old right information Ao of the target user Ut is limited. At this time, for instance, the use limiting part 46 specifies the old right information Ao as an object whose use is to be limited on the basis of the assigned organization change managing table T2.

As a specific example, the example that contents shown in FIGS. 5 and 6 are stored in the right information database D1 will be described. In this case, when the detecting part 45 detects the start of the use based on the right information A2 associated with the department P2 by the user U1 as the target user Ut, the use limiting part 46 limits the use of the user U1 based on the right information A1 associated with the department P1. For instance, the use limiting part 46 deletes information showing the user U1 from the user specifying information for specifying the users belonging to the department P1. FIG. 7 shows the contents of the right information table T1 under a state that the information showing the user U1 is deleted from the right information table T1 shown in FIG. 5 by the use limiting part 46.

Thus, after the use is limited by the use limiting part 46, the target user Ut is restrained from using each image processor 4 based on the old right information Ao, and accordingly, the target user Ut uses each image processor 4 on the basis of the new right information An. That is, the use limiting part 46 limits the use, so that the change of the right to use of the target user Ut to the new right information An from the old right information Ao is completed that corresponds to the assigned organization change information received by the change information receiving part 44.

The use limiting part 46 may not limit the use of the target user Ut based on the old right information Ao immediately after the detecting part 45 detects the start of the use based on the new right information An, but may begin to limit the use based on the old right information Ao at a prescribed timing. Specifically, for instance, with an elapse of a prescribed period after the detecting part 45 detects the start of the use based on the new right information An, the use limiting part 46 may limit the use of each information processor based on the old right information Ao. In this case, when the target user Ut requests to use the image processor, the use permission/inhibition deciding part 43 decides whether the use of the image processor 4 is permitted or inhibited by using both the old right information Ao and the new right information An until the prescribed period elapses. However, when the old right information Ao is limited by the use limiting part 46 after the prescribed period elapses, the use permission/inhibition deciding part 43 decides whether the use of the image processor by the target user Ut is permitted or inhibited only on the basis of the new right information An.

Further, even if the detecting part 45 does not detect the start of the use based on the new right information An, for instance, when the prescribed period elapses after the change information receiving part 44 receives the assigned organization change information, the use limiting part 46 may limit the use based on the old right information Ao of the target user Ut at a prescribed timing. Thus, a state that the use of each image processor 4 by the target user Ut is permitted on the basis of both the old right information Ao and the new right information An is restrained from being continued for a prescribed period or more.

Now, some specific examples of methods will be described below that the detecting part 45 detects the start of the use of each information processor based on the new right information An of the target user Ut. Initially, the methods for detecting the start of the use based on the new right information An by using information for specifying the device that receives the request for use from the user will be described as a first example and a second example.

In the first example, the start of the use based on the new right information An is detected on the basis of the organization to which the information processor that receives the request for use from the target user ut. In this embodiment, as described above, each user allows the information processor 4 that the user requests to use to read the IC card 5 carried by the user himself or herself so that the request for using the image processor is carried out. In the first example, when each image processor 4 reads information recorded on the IC card 5 possessed by the user to certify the user, the image processor 4 informs the right information managing device 2 of information (information of certification) showing that the user is certified. The information of certification includes information for specifying the certified user and information for specifying the information processor 4 itself that certifies the user. The request for use based on which the use permission/inhibition deciding part 43 decides whether the use is permitted or inhibited may be used as the information of certification. Further, it is assumed that a device managing server (not shown in the drawing) such as a directory server installed in the information processing system 1 stores information that associates each image processor 4 in the image processing system 1 with the organization to which the image processor 4 belongs.

In the first example, when the detecting part 45 receives the information of certification of the target user Ut from the image processor 4, the detecting part 45 makes an inquiry to the device managing server to specify the organization to which the image processor 4 certifying the user belongs. Then, when the specified organization is the new organization to which the target user Ut belongs, the detecting part 45 decides that the target user Ut starts the use of the image processor 4 based on the new right information An.

In this example, the information for coordinating each image processor 4 with the organization to which the image processor 4 belongs that is to be stored in the device managing server may be stored in the right information managing device 2 or the user managing device 3. Further, when the image processor 4 certifying the target user Ut belongs to other organization than the old organization, the detecting part 45 may decide that the use of the image processor 4 based on the new right information An by the target user Ut is started.

Otherwise, in the first example, the device managing server may store information for coordinating each image processor 4 with a place where the image processor is installed (for instance, the name of a floor or the like). In this case, the right information managing device 2 stores information that associates each organization with a place where the organization exists. Then, when the place where the image processor 4 certifying the target user Ut is installed is an installed place associated with the new organization or is not an installed place associated with the old organization, the detecting part 45 decides that the target user Ut starts the use of the image processor 4 based on the new right information An.

Now, as the second example, the example of the method for detecting the start of the use based on the new right information An will be described on the basis of the information processor receiving the request for use from the target user Ut and the using history of the information processor by the target user Ut. In this example, the image processor 4 informs the right information managing device 2 of an information of certification as in the first example. Further, the right information managing device 2 stores history information showing the using history of each image processor 4 by the user in the storing part 12. This history information is generated every time each image processor 4 executes various kinds of processes in accordance with the request of the user to associate the user and the image processor 4 used by the user with information showing a time of use (for instance, a date of use) and the contents of the use (that is, the contents of processes executed by the image processor 4). This history information is transmitted to the right information managing device 2 from each image processor 4 and stored in the right information managing device 2.

In the second example, when the right information managing device 2 receives the information of certification of the target user Ut from the image processor 4, the detecting part 45 refers to the history information stored in the storing part 12 to decide whether or not the using history exists showing that the target user Ut uses the image processor 4 certifying the user in the past. As a result of this decision, when it is decided that the using history of the image processor 4 which certifies the user and transmits the information of certification does not exist in the past, the detecting part 45 detects that the use of the image processor 4 based on the new right information is started. According to the second example, the information used in the first example is not necessary that associates each image processor 4 with the organization to which the image processor 4 belongs.

When the detecting part 45 receives the information of certification of the target user Ut, the detecting part 45 may make the above-described decision by using the history information showing a using history for a prescribed period of the history information stored in the storing part 12. In this case, for instance, when the target user Ut tries to use the image processor 4 that the target user Ut does not use for the prescribed time in the past, the detecting part 45 detects that the target user Ut starts the use based on the new right information An.

Now, a specific example of the method for detecting the start of the use based on the new right information An by using information inputted by the target user Ut during certifying the target user Ut will be described below as a third example. In the third example, it is assumed that a terminal device (not shown in the drawing) such as a personal computer included in the information processing system 1 receives information for certifying the target user Ut in place of the image processor 4. In this example, when the user uses the terminal device, the user inputs information for specifying the user himself or herself (for instance, a user ID), information for certification (for instance, a password) and information concerning the organization to which the user himself or herself belongs (for instance, a domain name). The terminal device receiving the input transmits the received user ID and the password to the certifying server for managing the user who belongs to the organization specified by the domain name. The certifying server receiving the user ID and the password collates the certifying information held by itself with the received information to certify the user.

At this time, the terminal device informs the right information managing device 2 of information, as the information of certification, including the information for specifying the user to be certified and the information concerning the organization inputted by the user to which the user belongs. When the detecting part 45 receives the information of certification of the target user Ut from the terminal device, the detecting part 45 detects the start of the use based on the new right information An of the target user Ut in accordance with the information concerning the organization to which the user belongs and that is included in the information of certification. Specifically, when the organization to which the user belongs and that is indicated by the information included in the information of certification is the new organization or is not the old organization, the detecting part 45 decides that the use of the information processor based on the new right information An is started.

Then, a specific example of the method for detecting the start of the use based on the new right information An on the basis of the contents of the request for use from the target user Ut, the old right information Ao and the new right information An will be described below as a fourth example. In this example, when the use permission/inhibition deciding part 43 receives the request for use from the target user Ut, the use permission/inhibition deciding part 43 decides whether the use of the image processor is permitted or inhibited on the basis of the old right information Ao and the new right information An. Then, in accordance with a decided result, the detecting part 45 detects the start of the use based on the new right information An. Specifically, when the detecting part 45 receives the request for use from the target user Ut that the use is not permitted in deciding whether or not the use of the image processor based on the old right information Ao is permitted, and the use is permitted in deciding whether or not the use of the image processor based on the new right information An is permitted, the detecting part 45 decides that the use based on the new right information An is started. As one example, it is assumed that the image processors 4 designated to be available in the old right information Ao are different from those designated in the new right information An. In this example, when the target user Ut requests to use the image processor 4 whose use is permitted in the new right information An, the detecting part 45 detects the start of the use based on the new right information An.

Further, the detecting part 45 may detect the start of the use based on the new right information An by the target user Ut only in accordance with a result of a decision made by the use permission/inhibition part 43 as to whether the use is permitted or inhibited on the basis of the old right information Ao. That is, when the detecting part 45 receives from the target user Ut such a request for use in which the use of the image processor is not permitted in the decision based on the old right information Ao, the detecting part 45 may decide that the use of the image processor based on the new right information is started.

The detecting part 45 may detect the start of the use of the information processor based on the new right information An of the target user Ut by combining together some of the above-described methods.

According to the above-described embodiment, the right information managing device 2 limits the use of each information processor in the information processing system 1 based on the old right information Ao by the target user Ut in accordance with the start of the use of each information processor in the information processing system 1 based on the new right information An by the target user Ut. Thus, the use of the information processing system 1 based on the old right information Ao by the target user Ut is permitted until the target user Ut starts the use based on the new right information An, however, when the target user Ut starts the use based on the new right information An, the use of the information processing system 1 based on the old right information Ao is limited.

The embodiment of the present invention is not limited to the above-described embodiment. For instance, the right information as an object to be managed by the right information managing device 2 is not limited only to the information showing the right to use to the image processor 4 and may be information showing rights to use to various kinds of information processors. Further, the right information may show not only a device whose use is permitted by the user or kinds of permitted uses, but also, for instance, information resources whose access of the user is permitted in each device. As a specific example, the right information may correspond to an access right to each file stored in a file server. In this case, the right information managing device 2 transmits the right information associated with the user as an object to be requested to the file server in accordance with a request of the file server. Then, the file server decides whether or not the request for access of the user to each file is permitted on the basis of the right information transmitted from the right information managing device 2.

Further, in the above-description, the right information is associated with any of the plural organizations, and the plural users belonging to the same organization has the same right to use. However, the present invention is not limited thereto. For instance, the right information may be associated with each of the individual users. FIG. 8 is a diagram showing one example of contents of the right information table T1 in this case. In the example shown in FIG. 8, the user U1 is associated with the right information A1, A2 and A3 and is permitted to use each information processor on the basis of rights to use designated by these right information. The right information A1 of these right information corresponds to the old right information Ao, and the right information A2 corresponds to the new right information An. When the detecting part 45 detects the start of the use based on the right information A2, the use limiting part 46 limits the use of each information processor based on the right information A1 by the user U1. According to this example, when a change arises in the right to use set to the target user Ut not only due to the change of the organization to which the user belongs, but also due to various kinds of factors, the target user Ut is permitted to use each information processor in the information processing system 1 on the basis of the old right information Ao until the target user Ut starts the use based on the new right information An. In this example, the user U1 is permitted to use each information processor on the basis of the right information A3 whether the use limiting part 46 begins to limit the use of the information processor or not.

Further, in the above-description, the use permission/inhibition deciding part 43 decides whether the use of the information processor requested by the target user Ut is permitted or inhibited in accordance with both the old right information Ao and the new right information An until the use limiting part 46 begins to limit the use of the information processor based on the old right information Ao. However, the use permission/inhibition deciding part 43 may limit the decision as to whether the use of the information processor based on the new right information An is permitted or inhibited until the use limiting part 46 limits the use of each information processor based on the old right information Ao. In this case, specifically, the use permission/inhibition deciding part 43 decides whether the use of the information processor requested by the target user Ut is permitted or inhibited on the basis of the old right information Ao without using the new right information An. In this case, a state does not exist whether the use of the information processor requested by the target user Ut is permitted or inhibited is decided on the basis of both the old right information Ao and the new right information An. For instance, when the transmitting process of the facsimile device cannot be carried out in the old right information Ao, and, on the other hand, the transmitting process of the facsimile device can be carried out in the new right information An, the transmitting process of the facsimile device is not permitted until the use based on the old right information Ao begins to be limited. Further, in the above-description, the use permission/inhibition deciding part 43 decides whether or not the use of the information processor relative to the request for use of the user is permitted, however, each information processor itself such as the image processor 4 may decide whether or not the use of the information processor is permitted. In this case, the right information managing device 2 returns the right information associated with the user as an object to be requested to the information processor transmitting the request in accordance with the request transmitted from each information processor. In this example, the use limiting part 46 changes the coordinating relation between the target user Ut and the right information in accordance with the detected result of the detecting part 45, so that the use of the information processor based on the old right information Ao of the target user Ut is limited.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A right information managing device comprising:
a right information storage that associates both old right information and new right information with a target user, and that stores, as first right information showing the right to use of the target user for an information processor, the new right and old right information associated with the target user;
a detecting unit that detects a start of a use of the information processor based on the new right information, by the target user; and
a use limiting unit that limits the use of the information processor based on the old right information by the target user, in accordance with a result obtained by the detecting unit, wherein
the right information storage associates each of a plurality of organizations and second right information showing the right to use of the user belonging to the organizations, and stores the target user associated with both an old organization and a new organization of the plurality of organizations,
the old right information is right information associated with the old organization, and
the new right information is right information associated with the new organization.

2. The right information managing device as claimed in claim 1, further comprising:
a use permission/inhibition determining unit that determines the permission/inhibition of a requested use on the basis of the right information stored to be associated with the target user in accordance with a request for use from the target user, and the use permission/inhibition determination unit limits to make a determination based on the new right information until the use limiting unit limits the use of the information processor based on the old right information.

3. The right information managing device as claimed in claim 1, further comprising:
a use permission/inhibition determining unit that determines the permission/inhibition of a requested use on the basis of the right information stored to be associated with the target user in accordance with a request for use from the target user, and the unit limits to make a determination based on the new right information until the use limiting unit limits the use of the information processor based on the old right information.

4. An information processing system comprising:
a user managing device; and
a right information managing device,
the user managing device including:
a user-related information storage that associates a user and user-related information related to the user, and that stores the user-related information associated with the user; and
a change notifying unit that notifies the right information managing device of information showing a change when the user-related information is changed, and
the right information managing device including:
a right information storage that associates old right information with the user, and that stores, as right information showing the right to use of the user for an information processor, the old right information associated with the user;
a change information receiving unit that receives the information showing the change;
an updating unit that updates the information stored in the right information storage so that new right information is associated with a target user in addition to the old right information on the basis of the information showing the change received by the change information receiving unit;
a detecting unit that detects a start of a use of the information processor based on the new right information, by the target user; and
a use limiting unit that limits the use of the information processor based on the old right information by the target user, in accordance with a result obtained by the detecting unit, wherein
the right information storage associates each of a plurality of organizations and second right information showing the right to use of the user belonging to the organizations, and stores the target user associated with both an old organization and a new organization of the plurality of organizations,
the old right information is right information associated with the old organization, and
the new right information is right information associated with the new organization.

5. A non-transitory computer readable medium storing a program causing a computer to execute a process for managing right information, the process comprising:
associating old right information and new right information with a target user, and storing, as the right information showing the right to use of the target user for an information processor, the new right and old right information associated with the target user;
detecting a start of a use of the information processor based on the new right information, by the target user; and
limiting the use of the information processor based on the old right information by the target user, in accordance with a result obtained in the detecting of the start, wherein
the associating includes associating each of a plurality of organizations and second right information showing the right to use of the user belonging to the organizations, and storing the target user associated with both an old organization and a new organization of the plurality of organizations,
the old right information is right information associated with the old organization, and
the new right information is right information associated with the new organization.

6. The right information managing device as claimed in claim 1, wherein the old right information and the new right information are information of the same form.

7. The information processing system as claimed in claim 4, wherein the old right information and the new right information are information of the same form.

8. The non-transitory computer readable medium as claimed in claim 5, wherein the old right information and the new right information are information of the same form.

9. The right information managing device as claimed in claim 1, wherein the new right information is an updated version of the old right information.

10. The information processing system as claimed in claim 4, wherein the new right information is an updated version of the old right information.

11. The non-transitory computer readable medium as claimed in claim 5, wherein the new right information is an updated version of the old right information.

* * * * *